Feb. 11, 1969   L. J. BURANT ET AL   3,427,201
DEFERRED ACTION BATTERY
Filed March 14, 1966   Sheet 1 of 2
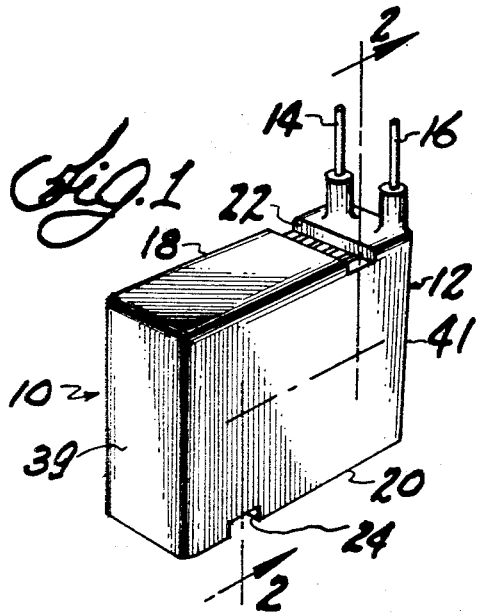
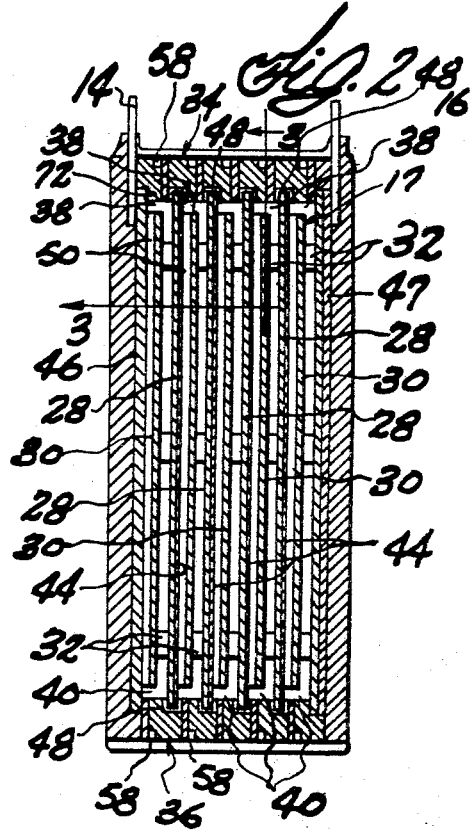
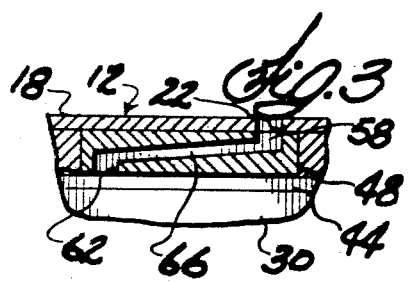
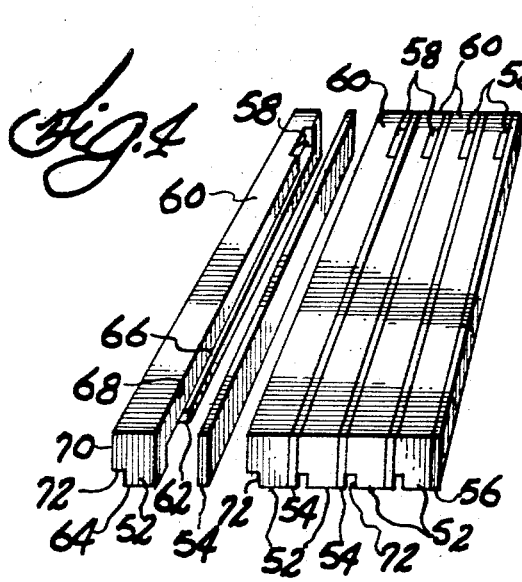
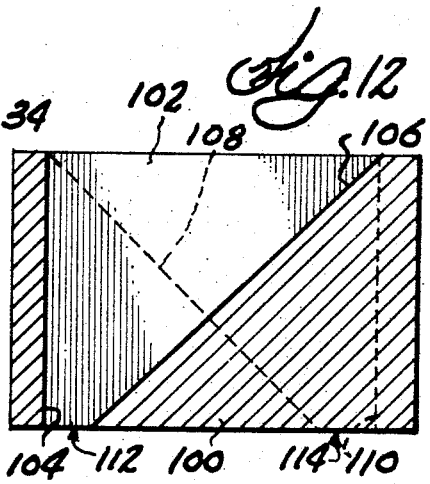
INVENTORS
Leonard Joseph Burant
Ronald Maynard Fiandt
BY Pendleton, Neuman,
Seibold & Williams
Attorneys

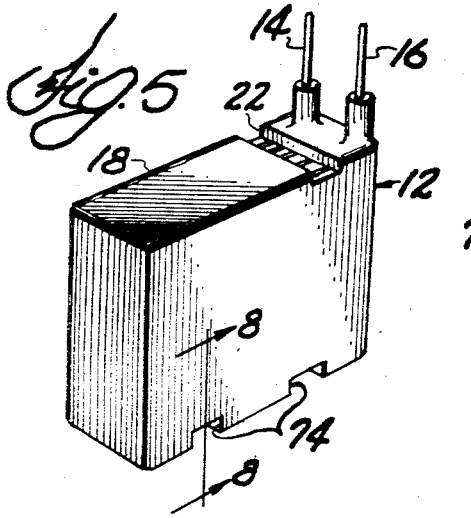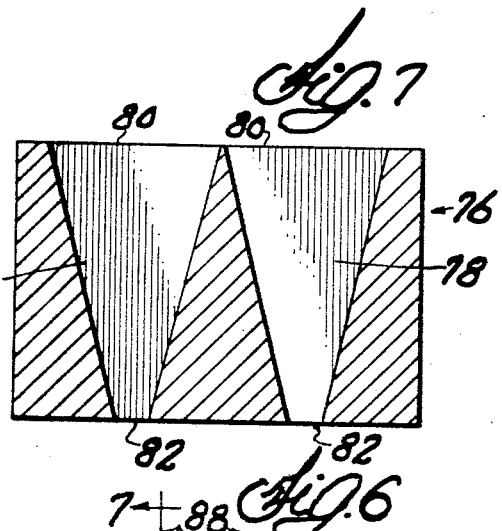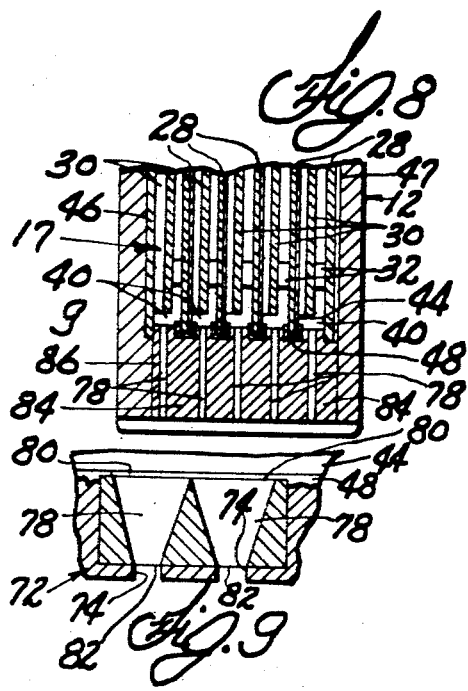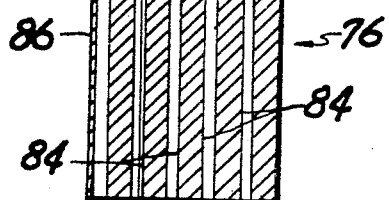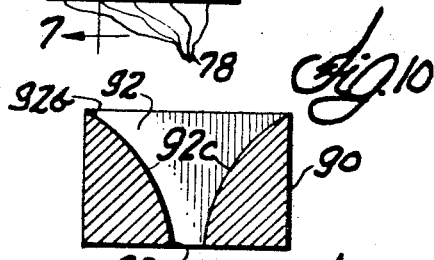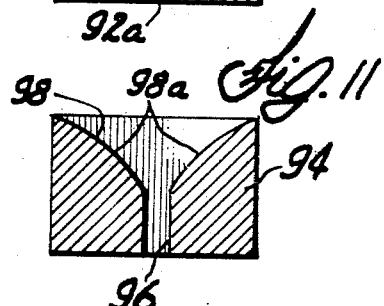

United States Patent Office 3,427,201
Patented Feb. 11, 1969

3,427,201
DEFERRED ACTION BATTERY
Leonard Joseph Burant, 3714 N. Maryland Ave., Milwaukee, Wis. 53211, and Ronald Maynard Fiandt, Menomonee Falls, Wis. (900 E. Keefe Ave., Milwaukee, Wis. 53201)
Filed Mar. 14, 1966, Ser. No. 535,653
U.S. Cl. 136—100    14 Claims
Int. Cl. H01m 21/12

This invention relates to deferred action batteries and, more particularly, to such batteries as are adapted to be activated upon immersion in sea water.

In accordance with conventional practice, such batteries are usually made up of a plurality of cells, each cell comprising a magnesium alloy anode and a silver chloride cathode with a suitable spacing medium positioned between the anode and cathode of each cell. Partition means are also employed intermediate said cells to isolate adjacent cells. The anodes, cathodes, spacers and partitions are arranged to provide a plurality of cells which are substantially enclosed in a battery casing having one or more openings therein for the ingress and egress of the activating fluid. The completed battery structure is activated by immersion in sea water, or other suitable electrolyte.

One form of battery construction of this general type is illustrated in the pending application of Burant et al., Ser. No. 287,171. Therein is disclosed a multicell battery having generally rectangular anode and cathode electrodes and intermediate reaction space. The electrodes are arranged so that the opposed marginal edges of one set of electrodes extend beyond the corresponding opposed marginal edges of the other set of electrodes in a direction parallel to the electrodes. The battery casing engages the outermost of said edges to provide a chamber associated with each cell for the distribution of electrolyte thereto, the chambers communicating directly with the casing openings, and adjacent chambers being closely spaced at the points of such communication.

Batteries of the foregoing type present inherent design problems. Such batteries are conventionally vented at the top and bottom so that sufficient electrolyte will continuously flow through the battery to maintain the cells in active condition and to remove reaction products. If, however, the battery is completely open at the top and bottom to permit the maximum movement of electrolyte, low battery efficiency and short battery life are caused by effective short circuiting between cells through the electrolyte. This undesirable result is commonly referred to as interport current leakage. Because of the employment of a common electrolyte having a relatively low impedance, short circuit paths by-passing the load and one or more cells are created. The amount of such current leakage, and resultant loss of efficiency and battery life, is governed by the resistance of the electrolyte between the cells as well as the potential difference between the cells. Thus, in designing electrolytic batteries of the type mentioned, the desire to move a substantial amount of electrolyte through the battery is necessarily balanced against the desire to isolate the electrolyte of the cells and their respective distribution chambers which comprise the battery.

In systems requiring relatively little current from the battery improved operation can be obtained with modified treatment of the battery ports to permit the discharge of reaction products downwardly through each cell while providing limited electrolyte access to the respective cells. In such instances, the required amount of electrolyte flow is low while any intercell or interport leakage becomes more critical. The resistance of a conductive material is generally determined by the relationship $$R = \rho \frac{L}{A}$$

where R is the resistance of a given path; $\rho$ is the resistivity of the material; L is the length of the path and A is the cross-section of the path.

In providing certain tapered configurations for the port openings, the effective cross-section is reduced, the leakage path is lengthened and the ability to discharge reaction products is still maintained.

Accordingly, it is an object of this invention to increase the useful life and efficiency of a deferred action battery.

Another object of this invention is to provide a deferred action battery construction which minimizes, if not completely eliminates, both interport current leakage and current leakage to ground.

Another object of this invention is to provide a multicell deferred action battery construction which has substantially long electrolyte paths between cells and between each cell and the associated electronic circuitry.

Another object of this invention is to provide a deferred action battery construction which will permit the continuous flow of sufficient electrolyte therethrough to maintain the cells in active condition and to remove reaction products and impurities therefrom.

Another object of this invention is to provide a battery construction characterized by complete and rapid distribution of electrolyte throughout each cell of the battery.

A further object of this invention is to provide a battery construction which includes an effective arrangement for maintaining anode-cathode spacing and isolation of adjacent cells without materially reducing the active area of the electrodes or interfering with the flow of electrolyte in the battery.

Another object of this invention is to provide an economical and readily assembled battery construction.

A still further object of this invention is to provide a deferred action battery which is activated by immersion in sea water and which functions at the maximum voltage per cell over a wide range of temperatures, salinity and current values.

A still further object of this invention is to avoid the need for an accumulation of single cell batteries.

A still further object of this invention is to provide all of the foregoing objects while maintaining a relatively simple and economical battery construction.

These and other objects and advantages will be manifest from an examination of the specifications, claims and drawings.

In accordance with one embodiment of the invention, there is provided a battery having at least two cells, each cell including a pair of relatively spaced electrodes, a first set of chambers associated with the tops of each of said cells and a second set of chambers associated with the bottoms of each of said cells, said chambers extending generally coextensively with at least a peripheral portion of said cells for admitting electrolyte to the areas between said electrodes, at least one manifold at the top of said battery providing electrolyte communication to said first set of chambers, at least one manifold at the bottom of said battery providing electrolyte communication to said second set of chambers, and a casing surrounding said cells and said manifolds including openings for admitting electrolyte to said manifolds, said manifolds containing an electrolyte passageway therethrough for each of said respective chambers, the length of said passageways from said opening to said chambers being substantially longer than the minimum distance between said opening and said chambers.

According to a modified form of the invention the manifold at the bottom of the battery is provided with a small passageway communicating with each cell. In a preferred form each passageway is tapered to optimize the discharge of impurities and reaction products by gravity while maximizing the interport resistance.

Reference will now be made to the accompanying drawings, in which:

FIG. 1 is a perspective view of one embodiment constructed in accordance with the present invention;

FIG. 2 is a sectional view taken along the line 2—2 of FIG. 1;

FIG. 3 is a partial sectional view taken along the line 3—3 of FIG. 2;

FIG. 4 is an exploded perspective view of one of the manifold sub-assemblies of the embodiment illustrated in FIG. 1;

FIG. 5 is a perspective view of another embodiment constructed in accordance with the present invention;

FIG. 6 is a vertical sectional view of a manifold sub-assembly of the embodiment illustrated in FIG. 5;

FIG. 7 is a sectional view taken along the line 7—7 of FIG. 6;

FIG. 8 is a partial sectional view taken along the line 8—8 of FIG. 5;

FIG. 9 is a partial sectional view taken along the line 9—9 of FIG. 8;

FIG. 10 is a partial sectional view of an alternate bottom manifold corresponding to that shown in FIG. 7;

FIG. 11 is a partial sectional view of still another alternate bottom manifold corresponding to that shown in FIG. 7; and FIG. 12 is a partial sectional view of still another alternate bottom manifold.

Referring now to the drawings, particularly FIGS. 1 through 4 thereof, a deferred action battery 10 according to one embodiment of the invention is illustrated as including an outer casing 12 and a pair of electrical leads 14 and 16 connected to a battery cell assembly 17 in a manner to be more fully described herein. The casing 12 is generally rectangular in shape and includes opposed upper and lower surfaces 18 and 20 having water ports or openings 22 and 24, respectively, so that as the battery is immersed in sea water, the sea water is admitted to the interior of the battery as an electrolyte to activate the battery. It will be appreciated that the number and location of water ports may be varied as desired.

The battery cell assembly 17 is made up of a plurality of cells, each comprising an anode 28 and a cathode 30. In accordance with general practice, the anode comprises a magnesium alloy and the cathode comprises a fused silver chloride sheet which is corrugated vertically to define electrolyte passageways. A plurality of insulating spacers 32 are positioned intermediate the anode and cathode to maintain a predetermined reaction space therebetween. The electrodes 28 and 30 are generally rectangular in shape, and the perimeter of the cathodes 30 is less than, and lies wholly within, the perimeter of the anodes 28, the outer margin of the anodes extending outwardly of that of the cathodes and engaging the interior surfaces of upper and lower manifolds 34 and 36. The interior surfaces of the manifolds 34 and 36 are spaced from the cathodes to provide chambers 38 and 40 which communicate with the water ports 22 and 24 as will be more fully described hereinafter. The chambers 38 and 40 extend generally coextensively with the upper and lower peripheral portions of the battery cells. These chambers insure rapid complete distribution of electrolyte throughout the battery cells, and between the cells, as the battery is immersed in water.

Although not illustrated in the drawings, the vertical margins of the cathodes 30 may also be spaced from the interior of the sides 39 and 41 of the casing to provide vertical chambers in the battery, as illustrated in the pending application of Burant et al., Ser. No. 287,171. It will be appreciated that, although desirable, these vertical chambers can be eliminated by extending the vertical edges of the cathodes to engage the interior surfaces of the casing. It will also be understood that although in the embodiment illustrated the outer margins of the anodes 28 engage the interior surfaces of the manifolds 34 and 36 while the outer margins of the cathodes 30 are spaced therefrom, the outer margins of the cathodes may instead extend beyond the anodes to accomplish the same result of forming the chambers 38 and 40. Alternatively, if the partitions 44 are self-supporting, only they need engage the interior surfaces of the manifolds to form the chambers 38 and 40. However, it is convenient to form the partitions 44 of metal foil and thus some supporting structure is necessary.

As more fully described in the aforementioned application of Burant et al., the cell assembly 17 may be a buildup of a plurality of sub-assemblies wherein each sub-assembly includes an anode 28, a cathode 30 and a cell partition 44 positioned therebetween, the partition 44 being attached to the anode 28 by a peripherally extending strip of tape 48 and to the cathode 30 by means of small spots of a suitable adhesive. So constructed, the sub-assemblies are arranged so that each provides a cathode 30 for one cell and an anode 28 for the next adjacent cell, with a partition 44 between adjacent cells and the projections 32 providing a reaction space between the anode and cathode of each cell.

As shown in FIG. 2, the left end of the cell assembly is formed by an end plate 46, preferably of silver plated cooper, having a cathode 30 attached thereto. The right end of the cell assembly comprises a second end plate 47 attached to an anode 28. Leads 14 and 16 are soldered to the end plates and a suitable electrical bond is formed between the end plates and their respective anode and cathode by welding or soldering.

As illustrated in FIG. 2 and described more fully in the aforesaid application of Burant et al., the cathodes 30 are provided with vertically extending protuberances or grooves 50 which engage the partitions 44 on one side and open toward the anodes on the other side. The spacers 32 provide a reactive space between the anode and cathode of each cell and the grooves 50 maintain a non-reactive space between each pair of adjacent cells. These non-reactive spaces provide for admission of electrolyte in sufficient quantities to provide temperature stabilization.

In order to minimize, if not eliminate, interport current leakage between the battery cells as well as current leakage to any other circuit components or to ground, which would be more likely to occur if the chambers 38 and 40 communicated directly with the battery casing ports or openings 22 and 24 respectively, the upper and lower manifolds 34 and 36 provide for the introduction of electrolyte to the chambers 38 and 40 and the associated battery cells through a plurality of passageways 66 which are substantially longer than the vertical distance between the chambers 38 or 40 and the associated casing openings. As best seen in FIGS. 2 through 4, the manifolds 34 and 36 of one embodiment of this invention comprise a plurality of elongated molded blocks 52, a plurality of elongated flat baffles 54 positioned between adjacent blocks and an additional baffle 56 disposed at one end of the manifold. The molded blocks and baffles may be formed of styrene or other similar material. As shown in FIG. 4, the blocks and baffles may be conveniently made as separate elements and secured together in aligned arrangement by adhesive or other similar material. While FIG. 4 illustrates only the upper manifold 34, it will be understood that the lower manifold 36 of this embodiment of the invention is substantially identical to the upper manifold 34.

Each manifold block 52 has an opening 58 adjacent one end of the upper surface 60 thereof, an opening 62 adjacent the opposite end of the bottom surface 64 thereof, and a generally diagonal passageway 66 extending between the openings 58 and 62 to provide a passageway for electrolyte which is substantially longer than the height of the manifold. The openings 58 communicate directly with the battery casing opening 22, and the openings 62 communicate directly with the chambers 38. In the case of the lower manifold 36, corresponding openings in the blocks 52 communicate with the lower battery casing opening 24 and the lower chambers 40.

As best seen in FIG. 4, the passageways 66 and openings 58 and 62 are formed in side surfaces 68 of the molded blocks 52. The opposed side surface 70 of each block 52 is provided with a rectangular slot 72 which extends along the entire length of the bottom surface 64 of the block. Each baffle 54 disposed between adjacent blocks 52 serves the dual purpose of forming the fourth side of the passageway 66 through one block as well as the third side of the slot 72 in the adjacent block. The slot 72 between adjacent blocks 52 are adapted to receive therein the outer marginal edges of the anodes 28 as well as their associated partitions 44 and tape strips 48, to form the chambers 38 and 40 without any fluid leakage between adjacent chambers. A cement or sealant may be employed in slots 72 if required. The slots 72 along one side of each manifold are adapted to receive the marginal edges of the end plates 46 and 47. When the blocks 52 and baffles 54 of the manifold are secured together, the slots 72 also serve to maintain the proper spaced-apart relationship of the several battery cells which comprise the cell assembly 17. After the cell assembly 17 has been positioned between and received in the slots of the upper and lower manifolds 34 and 36, the battery casing 18, which may be made of a suitable plastic material, is formed thereover to enclose the entire cell assembly 17 as well as the manifolds, leaving accessible only the extremities of the leads 14 and 16, for connecting the load, and the ports 22 and 24 for the admission of electrolyte.

It should be noted that a deferred action battery comprising upper and lower manifolds of the type hereinabove described not only facilitates assembly of the battery structure, but also provides for relatively long paths for the common electrolyte whereby the resistance of the electrolyte paths between the battery cells is so great as to minimize, if not eliminate, interport current leakage. It will also be appreciated that in batteries of the type described there is a reaction which may be expressed by the equation:

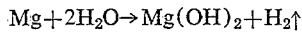

$$Mg + 2H_2O \rightarrow Mg(OH)_2 + H_2\uparrow$$

The $Mg(OH)_2$ produced by this reaction is only slightly soluble and the liberation of hydrogen, which occurs at the anode, induces the circulation of electrolyte through the battery. The liberated hydrogen rises in the reactive spaces, thus expelling fluid above it and pulling in fresh electrolyte bellow it. This "chimney effect" circulation is greatest when the battery is experiencing high currents and tends to flush the $Mg(OH)_2$ from the battery along with any other foreign substances which might tend to clog the battery and retard the main battery reactor. The ports 22 and 24 and associated manifolds 34 and 36 provide for ready egress and ingress of the electrolyte. Resistance to electrolyte flow into and through the battery is substantially reduced to insure a clean and unclogged battery interior.

Where the battery is intended to be used under static or relatively low flow conditions, it may be desirable to employ a modified form of manifold at the bottom of the battery to provide for the admission of electrolyte to the lower battery chambers 40. Modifications of the invention incorporating such a bottom construction are illustrated in FIGS. 5 through 11. The cell assembly 17 and the upper half of the battery, including the upper manifold 34, are substantially identical to the corresponding structure of the embodiment illustrated in FIGS. 1 through 4. In the modified form of the invention shown in FIGS. 7–9, however, the battery casing 12 is provided with a pair of bottom ports or openings 74, as shown in FIG. 5. The bottom manifolds 76 of this embodiment comprise a plurality of aligned pairs of tapered passageways 78 which converge downwardly from upper openings 80 therein in communication with the chambers 40 to lower openings 82 in communication with the casing openings or ports 74. Preferably, the angle formed by the converging sides of the passageways 78 should not exceed 30° to encourage rapid flow. It should also be noted that in this embodiment the height of the manifold (vertical distance between the upper and lower manifold openings 80 and 82 respectively) is substantially greater than the corresponding dimension of the upper manifold. Although this embodiment results in a battery having an over-all height somewhat greater than that of the first embodiment, the employment of tapered passageways 78 in lieu of the diagonal passageways of the lower manifold of the first embodiment permits the $Mg(OH)_2$ and any impurities to settle out through the bottom openings 82 under static or relative low flow conditions so as not to clog the battery.

The lower manifold 76 of this embodiment is generally rectangular in shape and may be molded as a unitary structure, such as from styrene or other similar material, or a plurality of separate blocks 84 may be assembled and secured together to form the manifold as shown in FIG. 6. The blocks 84 are formed with the tapered passageways 78 in one vertical surface thereof, the left end block 84 having attached thereto a baffle 86 to complete the left passageway 78. As in the case of the first embodiment of the invention, the manifold blocks 84 are provided with slots 88 which extend the full length of the upper surface of the blocks 84 to receive therein the lower marginal edges of the anodes 28 as well as their associated partitions 44 and tape strips 48, to form the lower chambers 40 without any fluid leakage between adjacent chambers. The right end plate 47 may also be received in the right hand slot 88. When assembled, the cell assembly 17 is positioned in the upper manifold 34 of the first embodiment and lower manifold 76 of the second embodiment, after which the battery casing 12 may be formed thereover in the same manner hereinbefore described with respect to the first embodiment.

An alternate and preferred form of the bottom manifold is illustrated in FIG. 10. The embodiment of FIG. 10 is especially useful where the battery is subjected to very light loads and long life is desired. The manifold 90 of FIG. 10 may be quite similar to the manifold 76 of FIGS. 6 and 7 and may either be molded as a single unit or constructed of laminations.

A tapered passageway 92 is provided for each cell very much as exemplified by the passageways 78 in the manifold 76 of FIG. 6. Similarly, recesses to receive the cell electrodes corresponding closely to the recesses 88 of FIG. 6 will also be formed in the manifold 90. Each passageway 92 has a small opening 92a at the bottom which provides relatively small cross-section and consequently, high resistance to either intercell leakage or leakage to other circuit components or to ground. The top of the passageway 92 defines a rapidly expanding bell 92b which will have a length substantially equal to the length of electrodes of the associated cell. Thus, any reaction products or impurities generated within the cell will fall to the curved surfaces 92c and fall downwardly through the small bottom opening 92a. This taper may be exponential or irregular depending upon the particular environment in which the battery is used and the overall design of the battery.

A further modification of the embodiment of FIG. 10 is illustrated in FIG. 11 where a manifold 94 is provided with a straight sided opening 96 communicating with an upper tapered passageway 98. This embodiment attains many of the advantages of the embodiment of FIG. 10 but by virtue of the straight sided lower cylindrical opening 96 still higher interport resistance is attained. It has been found in practice that the passageway 96 may either be of rectangular cross-section or may be formed by drilling or other techniques which provide a substantially round passageway.

In one embodiment having very low current demands, a small drilled hole of the order .06 inch was found adequate. The tapered upper surfaces 98a have sufficient slope to induce any impurities or reaction products to funnel by gravity downwardly through the cylindrical opening 96. The embodiments of FIGS. 10 and 11 are especially useful where current demands are low, and consequently, the upward movement of electrolyte is limited.

An alternate embodiment bearing some similarity to the embodiment of FIGS. 10 and 11 is illustrated in FIG. 12. The manifold 100 of FIG. 12 may be formed either by unitary molding or with a laminated construction. As shown in the sectional view of FIG. 12 the manifold 100 has a passageway 102 for electrolyte passing therethrough which is trapezoidal in shape. The passageway 102 is defined by a vertical wall 104 and a sloping wall 106 so that the lower opening 112 to the body of electrolyte is small and offset to one side of the battery. The next adjacent passageway which communicates with the next adjacent cell of the battery would also be trapezoidal as defined by a vertical wall 110 and a sloping wall 108. However, by alternating the shapes of the passageways 102 the small opening 114 defined at the bottom of the manifold by the walls 108 and 110 will be oppositely disposed from the opening 112. Each subsequent passageway has an opposite slope so that the openings are staggered. Thus, the interport spacing at the bottom of the manifold is increased by an amount equal to the thickness of one cell of the battery.

The manifold 102 will include grooves substantially identical to the grooves 88 in the manifold 76 of FIG. 6. The grooves are adapted to engage and be sealed to the lower edges of the battery electrodes as explained in detail above. The concept of staggering can, of course, be applied with facility to a configuration having a non-linear shape in the passageway as exemplified by FIGS. 10 and 11.

The foregoing will so completely describe the character of the present invention that others may, by applying current knowledge, readily adapt the same for use under varying conditions without departing from the essential features of novelty involved, which are intended to be defined and secured by the following claims.

What is claimed is:

1. A battery comprising at least two cells, each cell including a pair of adjacent electrodes defining a reaction space therebetween, a first set of chambers, each chamber of said first set associated with the top of one of said cells, a second set of chambers, each chamber of said second set associated with the bottom of one of said cells, each of said chambers extending generally coextensively with at least a peripheral portion of the associated cell providing electrolyte communication with the respective reaction space, at least a first manifold at one end of said battery for distributing electrolyte to said first set of chambers from a common source, and a casing surrounding said cells and said manifold including openings for providing electrolyte communication between said source and said manifold and the perimeter of one of said electrodes of each cell being larger than the perimeter of the other electrode and the outer margins of the larger electrode extending outwardly of said other electrode and sealingly engaging the manifold.

2. The battery of claim 1 wherein said manifold contains an electrolyte passageway therethrough for each of said respective chambers, the lengths of said passageways from said openings to said chambers being substantially longer than the minimum distance between said openings and said chambers.

3. The battery of claim 1 wherein said manifold has openings into said respective chambers on one surface of said manifold and openings into said casing opening on the opposite surface of said manifold and internal, isolated generally diagonal passageways therebetween.

4. the battery of claim 1 wherein said first manifold contains an electrolyte passageway therethrough for each of said first set of chambers, the lengths of said first manifold passageways from said first casing opening to said first set of chambers being substantially longer than the minimum distance between said first casing opening and said first set of chambers, including a second manifold containing an electrolyte passageway therethrough for each of said second set of chambers, each of said second manifold passageways having a pair of opposed walls which converge outwardly from said second set of chambers toward said second casing opening.

5. The battery of claim 4 wherein said manifolds include a first and a second opening for providing electrolyte communication between said source and said manifolds, said first manifold having openings into said first set of chambers on one surface of said first manifold and openings into said first casing opening on the opposite surface of said first manifold and internal, isolated, generally diagonal passageways therebetween, said second manifold containing an electrolyte passageway therethrough for each chamber of said second set, each of said second manifold passageways having a pair of opposed walls which converge outwardly from said second set of chambers toward said second casing opening.

6. A battery comprising a plurality of cells, each cell including an anode electrode and a cathode electrode spaced apart a predetermined distance from each other and having a substantially unobstructed reaction space therebetween, partition means disposed intermediate said cells and isolating adjacent cells, said electrodes being arranged so that at least a pair of opposed edges of one are spaced from corresponding opposed edges of the other in a direction parallel to said anode and cathode, at least one manifold sealingly engaging the outermost of said edges to provide a chamber for each of said cells extending generally coextensively with at least a peripheral portion of said unobstructed space to distribute electrolyte thereto, and casing surrounding said cells and said manifold including an opening for providing electrolyte communication between a common source and said manifold.

7. The battery of claim 6 wherein said manifold contains an electrolyte passageway therethrough for each of said chambers, the lengths of said passageways from said opening to said chambers being substantially longer than the minimum distance between said opening and said chambers.

8. The battery of claim 6 wherein said manifold has openings into said chambers of one surface of said manifold and openings into said casing opening on the opposite surface of said manifold and internal, isolated, generally diagonal passageways therebetween.

9. The battery of claim 6 wherein at least one manifold engages the outermost edge of each cell to provide upper chambers extending generally coextensively with at least the upper peripheral portions of said unobstructed spaces to distribute electrolyte thereto, and at least one manifold engages the outermost edge of each cell to provide lower chambers extending generally coextensively with at least the lower peripheral portions of said unobstructed spaces to distribute electrolyte thereto.

10. The battery of claim 6 wherein at least one manifold engages the outermost edge of each cell to provide upper chambers extending generally coextensively with at least the upper peripheral portions of said unobstructed spaces to distribute electrolyte thereto, and at least one manifold engages the outermost edge of each cell to provide lower chambers extending generally coextensively with at least the lower peripheral portions of said unobstructed spaces to distribute electrolyte thereto, said manifolds containing an electrolyte passageway therethrough for each of said respective chambers, the lengths of said passageways from said opening to said chambers being substantially longer than the minimum distance between said opening and said chambers.

11. The battery of claim 6 wherein at least one manifold engages the outermost edge of each cell to provide upper chambers extending generally coextensively with at least the upper peripheral portions of said unobstructed spaces to distribute electrolyte thereto, and at least one manifold engages the outermost edge of each cell to provide lower chambers extending generally coextensively with at least the lower peripheral portions of said unobstructed spaces to distribute electrolyte thereto, said manifolds having openings into said respective chambers on one surface of said manifolds and openings into said casing opening on the opposite surface of said manifolds and internal, isolated generally diagonal passageways therebetween.

12. The battery of claim 6 wherein at least one manifold engages the outermost edge of each cell to provide chambers extending generally coextensively with at least the peripheral portions of said unobstructed spaces to distribute electrolyte thereto, said manifold containing an electrolyte passageway therethrough for each of said chambers, each of said passageways having a pair of opposed walls which converge outwardly from said chambers toward said casing opening.

13. The battery of claim 6 wherein a first manifold at the top of said battery engages the outermost edge of each cell to provide upper chambers extending generally coextensively with at least the upper peripheral portions of said unobstructed spaces to distribute electrolyte thereto, and a second manifold at the bottom of said battery engages the outermost edge of each cell to provide lower chambers extending generally coextensively with at least the lower peripheral portions of said unobstructed spaces to distribute electrolyte thereto, said first manifold containing an electrolyte passageway therethrough for each of said upper chambers, the lengths of said first manifold passageways from a first casing opening to said upper chambers being substantially longer than the minimum distance between said casing opening and said upper chambers, said second manifold containing an electrolyte passageway therethrough for each of said lower chambers, each of said second manifold passageways having a pair of opposed walls which converge outwardly from said lower chambers toward a second casing opening.

14. The battery of claim 6 wherein a first manifold at the top of said battery engages the outermost edge of each cell to provide upper chambers extending generally coextensively with at least the upper peripheral portions of said unobstructed spaces to distribute electrolyte thereto, and a second manifold at the bottom of said battery engaging the outermost edge of each cell to provide chambers extending generally coextensively with at least the lower peripheral portions of said unobstructed spaces to distribute electrolyte thereto, said first manifold having openings into said upper chambers on one surface of said first manifold and openings into said casing opening on the opposite surface of said first manifold and internal, isolated, generally diagonal passageways therebetween, said second manifold containing an electrolyte passageway therethrough for each of said lower chambers, each of said second manifold passageways having a pair of opposed walls which converge outwardly from said lower chambers toward a second casing opening.

References Cited

UNITED STATES PATENTS

| 2,829,187 | 4/1958 | McDonald | 136—90 |
| 3,129,118 | 4/1964 | Wilke et al. | 136—100 |
| 3,261,718 | 7/1966 | Wilke | 136—90 |

WINSTON A. DOUGLAS, *Primary Examiner.*

A. SKAPARS, *Assistant Examiner.*

U.S. Cl. X.R.

136—90